Sept. 13, 1966     J. P. SACHS ETAL     3,272,674
PLASTIC FILM WELDING PROCESS AND APPARATUS
Filed May 28, 1962                          4 Sheets-Sheet 1

INVENTORS
JOHN P. SACHS
HOWARD E. KASTING
ALVIN E. ERICSON

BY Barnwell P. King
ATTORNEY

Sept. 13, 1966 J. P. SACHS ETAL 3,272,674
PLASTIC FILM WELDING PROCESS AND APPARATUS
Filed May 28, 1962 4 Sheets-Sheet 2

INVENTORS
JOHN P. SACHS
HOWARD E. KASTING
ALVIN E. ERICSON

BY Barnwell R. King
ATTORNEY

Sept. 13, 1966     J. P. SACHS ETAL     3,272,674
PLASTIC FILM WELDING PROCESS AND APPARATUS
Filed May 28, 1962     4 Sheets-Sheet 3

INVENTORS
JOHN P. SACHS
HOWARD E. KASTING
ALVIN E. ERICSON

BY Barnwell P. King
ATTORNEY

Sept. 13, 1966     J. P. SACHS ETAL     3,272,674
PLASTIC FILM WELDING PROCESS AND APPARATUS
Filed May 28, 1962     4 Sheets-Sheet 4

INVENTORS
JOHN P. SACHS
HOWARD E. KASTING
ALVIN E. ERICSON

BY Barnwell G. King
ATTORNEY

3,272,674
PLASTIC FILM WELDING PROCESS AND APPARATUS

John P. Sachs, La Grange, Howard E. Kasting, Park Forest, and Alvin E. Ericson, Chicago, Ill., assignors to Union Carbide Corporation, a corporation of New York
Filed May 28, 1962, Ser. No. 198,014
5 Claims. (Cl. 156—282)

This invention relates to welding thermoplastic films of relatively heavy cross-section under heat and pressure to obtain stronger and more uniform joints, and more particularly, to lap welding a selected number of plies of polyethylene film and/or sheet.

The primary object of the invention is to provide a method of and means for joining multiple layers of thermoplastic film with a uniformly strong, controlled lap weld of different total thicknesses in a single operation.

Strong, uniform heat seals are difficult to make in heavy gauge thermoplastic film, such as 4 mil to 11 mil polyethylene. Such film is considerably stiffer than 1 mil to 3 mil film material, commonly used for produce bags, garment bags, etc. A heat-seal joint between thermoplastic film plies is considered of optimum strength when the yield strength of the seal exceeds the yield strength of the individual parent film plies. Optimum heat-seal strength is obtained in an elongate welded lapped joint of thick polyolefin films such as polyethylene, when optimum temperature and sealing pressure are uniformly transmitted along the extent of the seal area and are maintained for an optimum sealing time interval.

Optimum sealing pressure is that which is sufficient to ensure intimate contact of the film plies at their interface, and which provides sufficient force to fuse the softened thermoplastic. Thus, according to the invention, the film plies are clamped flat before sealing. The sealing temperature and pressure are, at the same time, kept to optimum values to produce uniformly strong welds.

To obtain a uniformly strong weld or seal, we have found that a uniform pressure should be applied to the film plies adjacent the weld and maintained for a selected interval of time after removal of the weld heat, to prevent springback and permit the material in the weld to cool and consolidate the film plies.

In making a bottom closure in a shipping bag of heavy gauge thermoplastic film, the shipping bag bottom is preferably formed without creasing the flap folds, and the heat-seal joints are lapped and formed to transmit the filler bag stresses to the heat seal in shear.

Without hard creases defining the folds during the forming of the closure, the thick film plies tend to spring back, bulge and do not always lie completely flat at the fold edges. In such cases, the film plies may be locally separated at the interface of the desired weld or may be spaced from the welding backup surface. Thus, when a narrow elongated heat-sealing bar having transverse and/or branched surfaces is advanced toward the film flaps to make the desired lap weld joint in the bag bottom, the sealing surfaces initially contact those portions of the film surface which bulge upwardly and thus penetrate deeply into the top ply of film, resulting in localized weak and ineffective seal areas. Therefore, it is desirable to control springback as well as a flat co-planar condition of the thick film plies comprising the interfolded bag bottom, before the weld is made.

This invention combines two or more of several steps for improving the efficiency of lap welding a pile of thermoplastic films. Essentially these steps embody the further objects of the invention and are enumerated below for later references as follows:

Positive pressure clamping a plurality of film plies to flatten them against a flat resilient backup surface in an area immediately bordering welds to be made therein, and to ensure intimate contact of the individual film plies and uniform contact of the sealing bar at the weld interface.

Gauging the average thickness of the pile of film plies from a clamping platen, and thereby accurately controlling the penetration of a welding member into a pile of film plies.

Controlling or regulating heat-shrink effects by confining and thereby isolating tension and/or bending stresses in the film plies in the weld area.

Controlling the area of fusion zone in a plurality of extended, branched line lap welds made on a pile of thermoplastic films.

Individually controlling the depth of penetration of a plurality of welding surfaces into a pile composed of a different number of film plies.

According to the invention there is provided a method that combines clamping a pile of film plies adjacent the desired weld areas flat against a resilient backup surface, and accurately limiting the depth of penetration of the heat-sealing surfaces, respectively, into a plurality of plies while the weld is made. This permits using higher temperatures at the surfaces of the sealing bar and thus permits a shorter seal cycle and more uniform welds. This method is particularly useful for heat-sealing bi-oriented thermoplastic films which have a high shrink factor at fusing temperature.

The present method of clamping, welding and cooling a varying number of plies of plastic film to form a strong bag closure, employs an independently operated and sequenced flattening platen and a heat-sealing bar; and reciprocating means for applying pressure to the film plies interposed between them and a resilient pressure surface. A flat clamping-gauging platen is composed of metal of high heat conductivity, such as aluminum or brass, and is operated to advance and retract from the pile of film plies. Openings in the platen permit parts of an independently operated heat-seal bar to advance therethrough to the flattened film surfaces. The top of the platen is provided with adjustable stops to gauge and limit penetration of the welding surface into the film plies.

The clamping platen is also provided with circulating water passages to remove heat therefrom and thereby confine the fusion zone to a desired weld area and speed consolidation of the plies at the weld. The platen is retracted from the surface of the film plies after the sealing bar is removed therefrom to avoid springback as well as to provide the time lag and thermal capacity necessary to consolidate, i.e., weld the film plies together.

The sealing bar is of the heated-type, composed of metal with a high heat conductivity, such as aluminum or brass. The clamping platen surface is preferably spaced as closely as possible to the heat-seal bar extremities to clamp the film plies about substantially the entire periphery of the weld area. However, where film tension effects are minimal, such as at the end portions of extremely elongate weld areas, the clamping means need not circumscribe the narrow portion of the weld area.

A pressure is applied to the surface of the film plies by the clamping platen that is at least sufficient to obtain desired flattening against the pressure surface. Strong uniform film welds are obtained when stops on the top of the platen are adjusted to limit the penetration of the co-operating seal bar surfaces to obtain the strongest possible weld.

The area of the weld is supported by a base surface which is covered with a resilient cushion material, such as rubber. Satisfactory welds, however, may be made through a different number of film plies supported on a nonresilient base surface by appropriately machining the cooperating surface areas of the platen to compensate for the difference in film thicknesses.

When an extended area of weld is made through a diffrent number of film plies, the resilient surface may be appropriately elevated by an underlay at respective areas of lesser film thickness, and/or the respective heat-sealing surface areas may be machined to compensate for uniform weld penetration in the differing number of plies, as later described.

This invention is particularly useful for making strong, uniform welds in the end closure of polyethylene shipping bags. When forming the end closure of such shipping bags without using the invention, it was difficult to control the plies, and the seal of the closure frequently puckered up. When the heat-seal bar was withdrawn, the seal weld was in a softened state for a greater time interval and was more sensitive to residual bulges in the film plies of the closure. This adversely affected the uniformity of the filled bag from shipping or handling stresses imposed on the closure.

However, when bag end closures are made according to this invention, good uniformity in heat-seals are obtained even in the layers of film plies, such as polyethylene, which vary in total thickness from 8 to 34 mils. The clamping apparatus ensures flattening the plies against the resilient surface and maintains the plies flat, counteracting springback while the weld cools. The heat-absorbing capacity of the clamping platen also assists in compensating for any thermal inequality needed for welding a selected number of plies. This combination results in a stronger and more uniform heat-seal across the entire bag end closure.

The bag bottom is made in several steps. In a blanking operation, side flaps and end flaps are formed by slitting. The end flaps and side flaps are later interfolded and welded into an overlapped joint which is coextensive with the bag width. In such bottom closure, branch seals are angularly disposed to the coextensive joint to impart a siftproof quality to the closure. For operating efficiency, it is desirable that the coextensive seal and branch seals be made in a single operation against a backup platen located interiorly to the bag bottom.

The sealing of the bottom closure in a polyethylene bag made of 4 to 11 mil film, formerly required five separate sealing operations. Each individual seal was made with an impulse sealer and required a sealing cycle of about 7 seconds. With the present new method, however, the heat-sealing bar when used with polyethylene film of a density of about 0.925 is maintained at a constant temperature of from 575° to 775° F., and yields satisfactory welds in one operation for a total cycle time of less than 2 seconds.

The method of this invention is especially useful in the welding of highly oriented or bioriented polyethylene films and other oriented or bioriented polyolefin films including polyethylene copolymers, polypropylene, copolymers of ethylene and propylene and mixtures of polyethylene and polypropylene which are extremely difficult to weld because of heat shrink effects in the parent film immediately adjacent to the weld area.

The new method also makes possible the production of uniform welds that are continuous or discontinuous, and of complex shape, and in one operation forms a closure even in a relatively heavy wall plastic bag.

Figure 1:
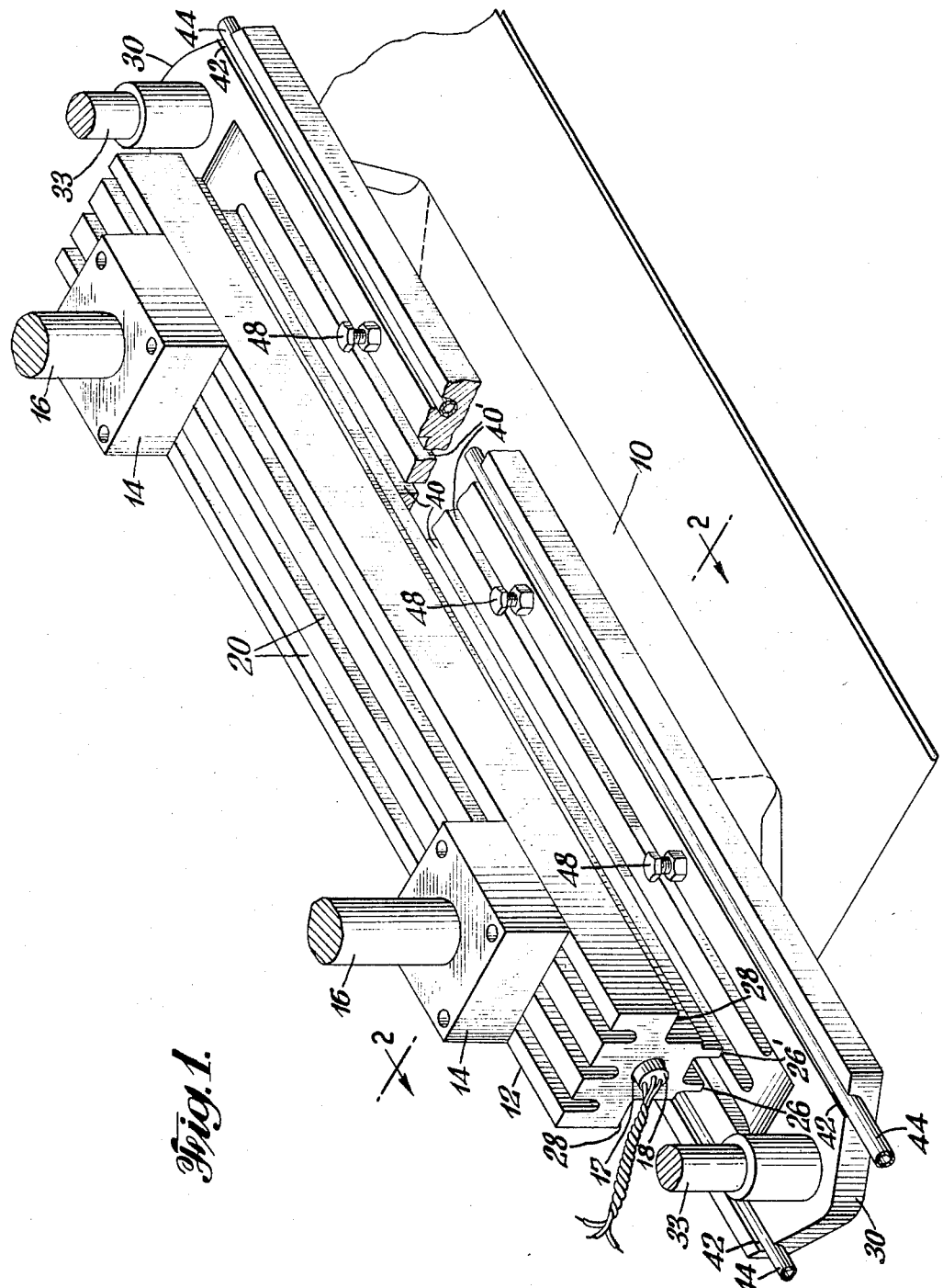
FIG. 1 is a fragmentary perspective view of apparatus embodying the invention.

Referring to FIG. 1, a heat-seal bar 12 is mounted on blocks 14 connected by shafts 16 to pneumatic cylinders (not shown) that advance and retract bar 12 toward a bag bottom 10 to be sealed. Bar 12 is provided with a longitudinal hole 17 to receive an electrical resistance heater element 18. The uppper part of the bar 12 has a plurality of deep grooves 20 therein. The resulting bar shape acts to distribute and balance heat energy from heater element 18 conducted through the metal of the bar to sealing surfaces 26, 26'. Sealing bar 12 has a plurality of machined shoulders 28, equidistant from the centerline of the bar 12 and accurately and equally spaced from sealing surfaces 26, 26'.

Figure 2:
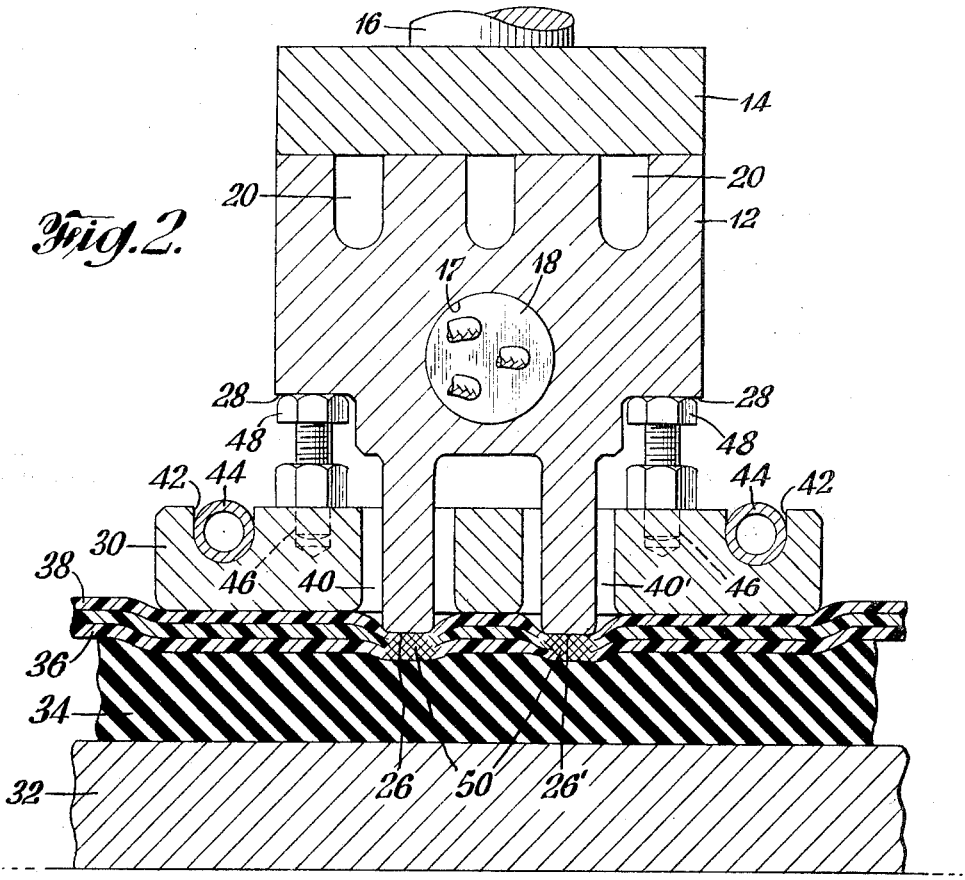
FIG. 2 is an enlarged fragmentary view in cross-section taken on line 2—2 of FIG. 1.

Clamping platen 30, FIGS. 1 and 2, is advanced and retracted toward the backup surface of base 32 of the machine by shafts 33 connected to additional pneumatic cylinders (not shown). A resilient member or cushion 34 is mounted on such surface which is flat. Such member 34 is composed of solid rubber of about 20° to 30° Shore durometer, which in turn, supports the thermoplastic film bag bottom 10 in position for the clamping and sealing operation.

In the sealing operation, the folded bottom of the bag is positioned under platen 30 which is then advanced to engage the film upper ply 38, flatten it against lower film ply 36 and the surface of resilient member 34, thereby clamping and compressing it on the surface of machine base 32. Clamping platen 30 has slots 40, 40' to pass corresponding sealing surfaces 26, 26' of sealing bar 12 centrally through each slot. Platen 30 also has grooves 42 equally spaced from slots 40, 40' to retain water-circulating tubing 44, which is pressed therein.

Platen 30 is provided with a plurality of tapped holes 46 adjacent slots 40, 40' to receive adjustment screws 48. Adjustment screws 48 are adjusted and locked to stop shoulders 28 to limit the advance of sealing surfaces 26, 26' with respect to the under surface of platen 30, and thereby control melt penetration into the surface of film ply 38. The depth of sealing surface penetration in combination with the cooling effect of the walls of slots 40, 40', controls and limits the fused film zones 50 of film plies 38 and 36. The sealing bar 12 is retracted from the weld surface while clamping platen 30 continues to clamp the plies of film and chill the fused film zones 50, thus permitting the stripping of the sealing surfaces 26, 26' cleanly from the film weld.

Using the method of the invention, it has been possible to weld two- and three-ply thicknesses of 10 mil polyethylene film into lap joints having satisfactory seal strength in 1½ seconds.

Figure 3:
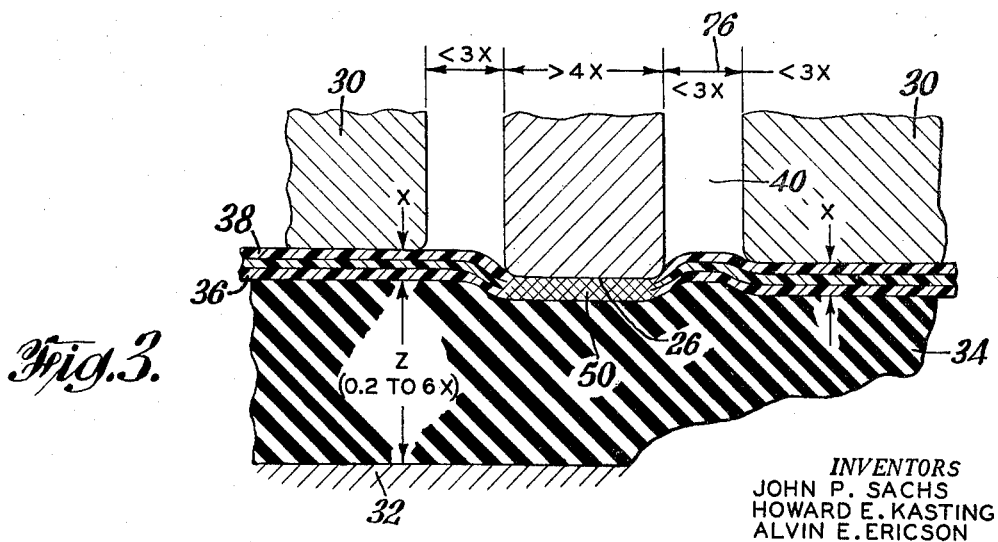
FIG. 3 is an enlarged fragmentary view in cross-section of the sealing bar and platen contacting the film plies on a resilient surface.

Referring now to FIG. 3, which shows an embodiment of a preferred relationship of clamping platen 30, sealing surface 26 and resilient pressure member 34, X represents the combined thickness of polyethylene film plies to be welded. Width of sealing surface 26 is greater than about 4X and the space 76 between the side walls of surface 26 and slot 40 of clamping platen 30 is less than about 3X. Resilient cushion 34 is rubber of 25° to 35° Shore durometer and of a thickness Z, such as about 0.2 to 6X. Sealing surface 26 is maintained at a temperature of the order of 725° F. heat by resistance heater 18, and depth of penetration into the film plies is set to about ⅓ to ⅔X by adjusting stop screws 48 mounted in platen 30 when clamping pressure on the film plies is set at 2 to 4 p.s.i.

Figure 4:
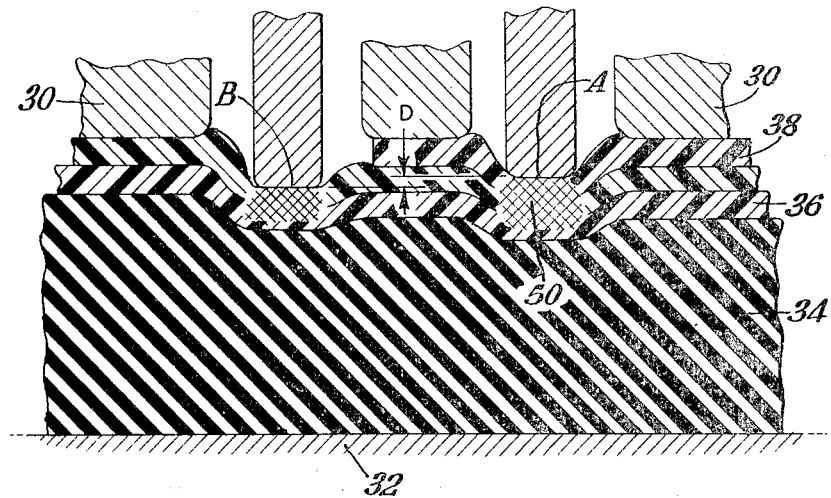
FIG. 4 is a schematic cross-sectional view of one arrangement of heat-seal surfaces welding varying numbers and thicknesses of film plies.

When it is desirable that one area A of a composite weld, FIG. 4, is to be heat-sealed through a greater number of film plies than another area B, the heat sealing surface 50 of the former area A may be machined (an amount D) to penetrate to about ⅓ to ⅔ that difference when limited by flat platen 30, clamping the pile of plies.

Figure 5:
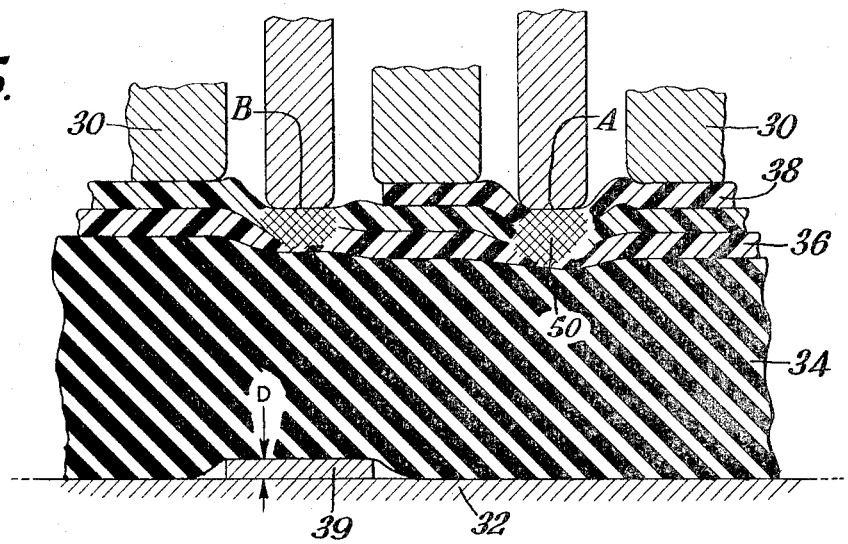
FIG. 5 is a fragmentary cross-sectional view of another arrangement of heat-seal surfaces welding varying numbers and thicknesses of film plies.

As an alternate method, FIG. 5, when one area A of a composite weld is to be heat-sealed through a greater number of film plies than another, area B can be elevated by underlaying with plies 39 of a thickness (an amount D') to penetrate to about ⅓ to ⅔ that difference when limited by flat platen 30, clamping the pile of plies.

Figure 6:
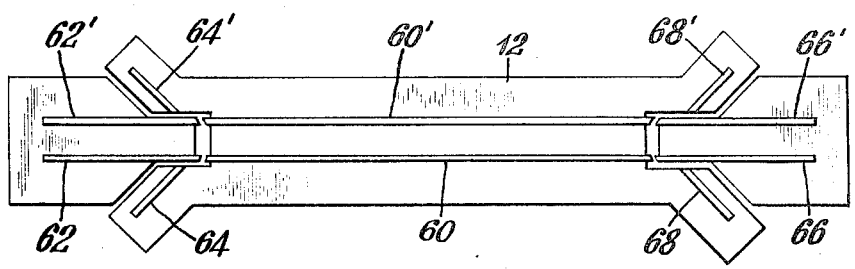
FIG. 6 is a bottom view of a heat-seal bar of an embodiment having two parallel and one or more branched sealing surfaces.

FIG. 6 shows a branched, parallel line heat-sealing member 12 that may be used to make the closure for the bag bottom. Such a bag closure may require a weld construction that is made up of 10 separate portions. In this embodiment, seals 60, 60' are made as parallel lines in *two plies* of film. Seals 62, 62' and 66, 66' at the extremities of the bag are made as parallel seals in *three plies* of film. Branch seals 64, 64' and 68, 68' are made to provide a siftproof bottom through *two plies* of film.

Figure 7:
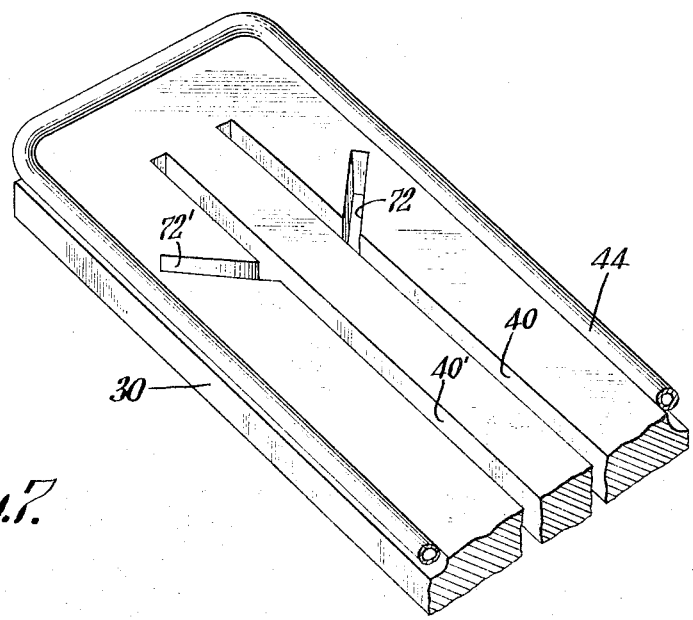
FIG. 7 is a fragmentary perspective view of the clamping platen.

FIG. 7 shows a portion of clamping platen 30 that is slotted to co-operate with the heat-sealing member of FIG. 6. Parallel slots 40, 40' are respectively spaced to pass sealing surfaces 60, 60' and 62, 62', FIG. 6, centrally therethrough. Likewise, branched slots 72, 72' are positioned to pass sealing surfaces 64, 64' centrally therethrough.

Figure 8:
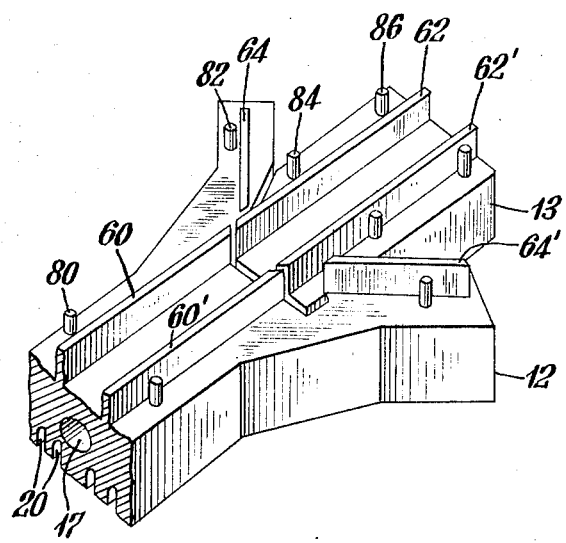
FIG. 8 is a fragmentary perspective view of an inverted portion of another embodiment of the heat-seal bar having separately operable sections.

FIG. 8 shows, upside down, a portion of an embodiment of a composite branched, parallel line heat-seal bar with separately mounted units 12 and 13. Units 12 and 13 of the composite heat-seal bar are advanced to the film surface by reciprocating means. When units 12, 13 are advanced, adjustable stop pins mounted on each unit engage the top surface of platen 30 and thereby regulate the respective penetration of each sealing unit into the film plies.

Unit 12 is provided with parallel seal surfaces 60, 60' and branched seal surfaces 64, 64' that are regulated to penetrate *two film plies* by engagement of adjustable pins 80, 82 with the top surface of clamping platen 30. Section 13 mounts parallel seal surfaces 62, 62' that are regulated to penetrate *three film plies* by engagement of adjustable pins 84, 86 with the top surface of clamping platen 30.

The embodiment of the heat-seal bar shown in FIG. 4, is preferred for making a uniform strength weld construction in a single operation in an extended bag closure, having in its length a varying number of film plies, by providing regulated penetration of the sealing surfaces according to the number of plies under the respective surface area.

While the invention is highly advantageous in the sealing of heavy gauge films, it is not restricted thereto being also suitable for thinner as well as thicker material.

What is claimed is:

1. Method of pressure welding thermoplastic films which comprises compressing the overlapping film material between a backup surface, and a platen in an area closely and completely surrounding the weld to be made, thereby flattening such material in such area, then softening with heat and under pressure such material while it is so compressed, by advancing the hot sealing surface of a heat-sealing bar into contact with such material within such area after compressing the overlapping film, with heat and pressure sufficient only to weld the material together, while controlling the degree of compression of such material between said platen and backup surface by variably limiting the advancing of said heat sealing surface toward said backup surface, simultaneously cooling such platen during such welding operation, and finally, first retracting said sealing surface from the weld and then releasing the so-welded material from such compression by withdrawing said platen to avoid springback and bulging of the film plies.

2. The method of claim 1, wherein the hot sealing surface is advanced toward the backup surface until said hot sealing surface penetrates into the film plies a distance equal to from about ⅓ to ⅔ the thickness of the film plies.

3. In plastic film welding apparatus for heat-sealing overlapping plies of thermoplastic material to form the bottom of a bag of such material in a single operation and having means for gauging the welding position of said sealing surface with respect to the clamping position of the bottom surfaces of said platen, the combination with a cushion, and a base member on the upper surface of which said cushion is supported, of a platen mounted for vertical movement above said cushion, said platen having bottom surfaces for clamping overlapping plies of such material against the surface of said cushion in the area immediately and completely surrounding the weld zone, having spaced vertical slots located above such zone, and having vertically adjustable stops mounted on said platen, a bar provided with heat-sealing surfaces adapted to contact such material under such slots after said platen clamps the overlapping plies and weld such overlapping plies while they are compressed between the upper surface of said cushion and the bottom surfaces of said platen, and shoulders on said sealing bar, said shoulders having under surfaces which contact the upper surfaces of said stops to limit the downward travel of said bar with respect to said platen according to the setting of said stops which are adjustable.

4. In apparatus as defined by claim 3, means for accommodating a different number of plies adjacent selected areas of said slots, between the upper surface of said cushion, and the clamping surfaces of said platen, so that such plies are uniformly compressed during the welding operation, said means comprising substantially rigid elevation means under said cushion in the welding area containing the minimum number of plies, said elevation means having a thickness at least about ⅓ the difference in film thickness between the film where welding occurs through maximum number of plies and where welding occurs through minimum number of plies.

5. The apparatus of claim 3, wherein the cushion has a Shore durometer hardness of from about 25° to 35° and a thickness from about 0.2 to 6 times the average thickness of film plies to be welded.

References Cited by the Examiner

UNITED STATES PATENTS 2,488,212 11/1949 Lloyd.
3,050,916 8/1962 Gausman et al. ___ 156—498 X
3,066,064 11/1962 Pommer _____ 156—498 X

FOREIGN PATENTS 740,811 11/1955 Great Britain.

EARL M. BERGERT, *Primary Examiner.*

B. BURNS, H. F. EPSTEIN, *Assistant Examiners.*